(12) United States Patent
Brandes et al.

(10) Patent No.: US 6,500,238 B1
(45) Date of Patent: Dec. 31, 2002

(54) FLUID STORAGE AND DISPENSING SYSTEM

(75) Inventors: George R. Brandes, Southbury, CT (US); Thomas H. Baum, New Faifield, CT (US); Michael A. Tischler, Phoenix, AZ (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 09/635,880

(22) Filed: Aug. 10, 2000

(51) Int. Cl.⁷ .............................................. B01D 53/04
(52) U.S. Cl. .............................. 95/148; 96/126; 96/143; 96/146
(58) Field of Search ................................ 95/18, 90, 99, 95/104–106, 114, 115, 148; 96/112, 126–128, 130, 143–146

(56) References Cited

U.S. PATENT DOCUMENTS

| | | | |
|---|---|---|---|
| 2,747,681 A | * 5/1956 | Schuftan et al. | ............ 95/99 X |
| 3,037,338 A | * 6/1962 | Thomas | ........................ 95/104 |
| 3,077,712 A | * 2/1963 | Milleron et al. | .............. 96/146 |
| 4,038,050 A | * 7/1977 | Lowther | .................... 96/146 X |
| 4,312,640 A | * 1/1982 | Verrando | ................... 96/130 X |
| 4,323,640 A | 1/1982 | Verrando et al. | |
| 4,744,221 A | 5/1988 | Knollmueller | |
| 5,308,457 A | * 5/1994 | Dalla Betta et al. | ...... 96/146 X |
| 5,429,665 A | * 7/1995 | Botich | ........................... 95/99 |
| 5,509,956 A | * 4/1996 | Opperman et al. | ....... 96/146 X |
| 5,518,528 A | 5/1996 | Tom et al. | |
| 5,704,965 A | 1/1998 | Tom et al. | |
| 5,704,967 A | 1/1998 | Tom et al. | |
| 5,707,424 A | 1/1998 | Tom et al. | |
| 5,761,910 A | 6/1998 | Tom et al. | |
| 5,827,355 A | * 10/1998 | Wilson et al. | ................. 95/114 |
| 5,837,027 A | * 11/1998 | Olander et al. | ........... 95/106 X |
| 5,935,305 A | 8/1999 | Tom et al. | |
| 5,980,608 A | 11/1999 | Dietz et al. | |
| 5,993,766 A | * 11/1999 | Tom et al. | ................... 95/90 X |
| 6,022,399 A | * 2/2000 | Ertl et al. | ...................... 95/114 |
| 6,083,298 A | * 7/2000 | Wang et al. | .............. 95/106 X |
| 6,110,257 A | * 8/2000 | Tom | ......................... 95/106 X |

* cited by examiner

Primary Examiner—Robert H. Spitzer
(74) Attorney, Agent, or Firm—Margaret Chappuis; Marianne Fuierer

(57) ABSTRACT

A system for storage and dispensing of a sorbate fluid, in which a sorbate fluid is sorptively retained on a sorbent medium and desorption of sorbate fluid from the sorbent medium is facilitated by inputting energy to the sorbent medium including one or more of the following energy input modes: (a) thermal energy input including inductive heating of the sorbent medium, resistive heating of the sorbent medium and/or chemical reaction heating of the sorbent medium; (b) photonic energy input to the sorbent medium; (c) particle bombardment of the sorbent medium; (d) mechanical energy input to the sorbent medium; and (e) application of a chemical potential differential to the sorbate fluid on the sorbent medium.

34 Claims, 2 Drawing Sheets

FLUID STORAGE AND DISPENSING SYSTEM

BACKGROUND OF THE INVENTION

1. Field of the Invention

This invention relates to a fluid storage and gas dispensing system with utility as a gas source for the manufacture of semiconductor devices and materials.

2. Description of the Related Art

In a wide variety of industrial processes and applications, there is a need for a reliable source of process fluid(s).

Such process and application areas include semiconductor manufacturing, ion implantation, manufacture of flat panel displays, medical intervention and therapy, water treatment, emergency breathing equipment, welding operations, space-based delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite. The arsine is subsequently dispensed by heating the zeolite to an elevated temperature of up to about 175° C. for sufficient time to release the arsine from the zeolite material. U.S. Pat. No. 5,518,528 issued May 21, 1996 in the names of Glenn M. Tom and James V. McManus, describes a gas storage and dispensing system, comprising an adsorptiondesorption apparatus, for storage and dispensing of a gas, e.g., a hydride gas, halide gas, organometallic Group V compound, etc. The gas storage and dispensing vessel of the Tom et al. patent reduces the pressure of stored sorbate gases by reversibly adsorbing them onto a carrier sorbent medium such as a zeolite or activated carbon material.

More specifically, such storage and dispensing system comprises: a storage and dispensing vessel constructed and arranged for holding a solid-phase physical sorbent medium, and for selectively flowing gas into and out of said vessel; a solid-phase physical sorbent medium disposed in said storage and dispensing vessel at an interior gas pressure; a sorbate gas physically adsorbed on the solid-phase physical sorbent medium; a dispensing assembly coupled in gas flow communication with the storage and dispensing vessel, and constructed and arranged to provide, exteriorly of the storage and dispensing vessel, a pressure below said interior pressure, to effect desorption of sorbate gas from the solid-phase physical sorbent medium, and gas flow of desorbed gas through the dispensing assembly; wherein the solid-phase physical sorbent medium is devoid of trace components such as water, reactive (non-inert) metals, and oxidic transition metal species (e.g., oxides, sulfites and/or nitrates) which would otherwise decompose the sorbate gas in the storage and dispensing vessel.

By the elimination of such trace components from the solid-phase physical sorbent medium, the decomposition of the sorbate gas after 1 year at 25° C. and interior pressure conditions is maintained at extremely low levels, e.g., so that not more than 1–5% by weight of the sorbate gas is decomposed.

The storage and dispensing vessel of the Tom et al. patent thus embodies a substantial advance in the art, relative to the prior art use of high-pressure gas cylinders. Conventional high pressure gas cylinders are susceptible to leakage from damaged or malfunctioning regulator assemblies, as well as to rupture or other unwanted bulk release of gas from the cylinder if internal decomposition of the gas leads to rapid increasing interior gas pressure in the cylinder.

The art continues to seek improvements in systems for storage and dispensing hazardous gases, to provide high levels of safety, the ability to release the gas to the tool or system as needed, with adequate storage volumes of gases, and economic advantages in capital and operating costs.

SUMMARY OF THE INVENTION

The present invention relates to a system for storage and dispensing of a fluid, for use in applications such as the manufacture of semiconductor products.

In one aspect, the invention relates to an apparatus for storage and dispensing of a sorbate fluid, comprising:

a storage and dispensing vessel with an interior volume containing a solid-phase physical sorbent medium having the sorbate fluid sorptively associated therewith;

a dispensing assembly coupled to the vessel in flow communication with the interior volume of the vessel for selectively discharging desorbed sorbate fluid from the storage and dispensing vessel; and an energy input unit arranged to enhance desorption of sorbate fluid from the sorbent medium, by inputting energy to the sorbent medium comprising at least one energy input modality selected from the group consisting of:

(a) thermal energy input including at least one modality selected from the group consisting of inductive heating of the sorbent medium, resistive heating of the sorbent medium, conductive heating of the sorbent medium and chemical reaction heating of the sorbent medium;

(b) photonic energy input to the sorbent medium (microwave, infrared, visible, ultraviolet, x-ray, gamma ray);

(c) particle bombardment of the sorbent medium (electron, proton, positron, neutron, alpha particle, atoms, ions or other more exotic particles or particle combinations);

(d) mechanical energy input to the sorbent medium (ultrasonic and/or acoustic); and (e) application of a chemical potential differential to the sorbent medium to effect release of the sorbate fluid from the sorbent medium.

In another aspect, the invention relates to a method of supplying a sorbate fluid for a use requiring same, comprising:

providing the sorbate fluid in a sorptively retained state on a sorbent medium; and desorbing sorbate fluid from the sorbent medium, comprising inputting energy to the sorbent medium including at least one energy input modality selected from the group consisting of:

(c) thermal energy input including at least one modality selected from the group consisting of inductive heating of the sorbent medium, resistive heating of the sorbent medium, conductive heating of the sorbent medium and chemical reaction heating of the sorbent medium;

(d) photonic energy input to the sorbent medium (microwave, infrared, visible, ultraviolet, x-ray, gamma ray);

(c) particle bombardment of the sorbent medium (electron, proton, positron, neutron, alpha particle, atoms, ions or other more exotic particles or particle combinations);

(d) mechanical energy input to the sorbent medium (ultrasonic and/or acoustic); and (e) application of a chemical potential differential to the sorbent medium to effect release of the sorbate fluid from the sorbent medium.

Although the invention is described herein primarily with reference to a gas as the sorbate fluid, it will be recognized that the invention is broadly applicable to liquids, gases, vapors, and multiphase fluids, and contemplates storage and dispensing of fluid mixtures as well as single component fluids.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
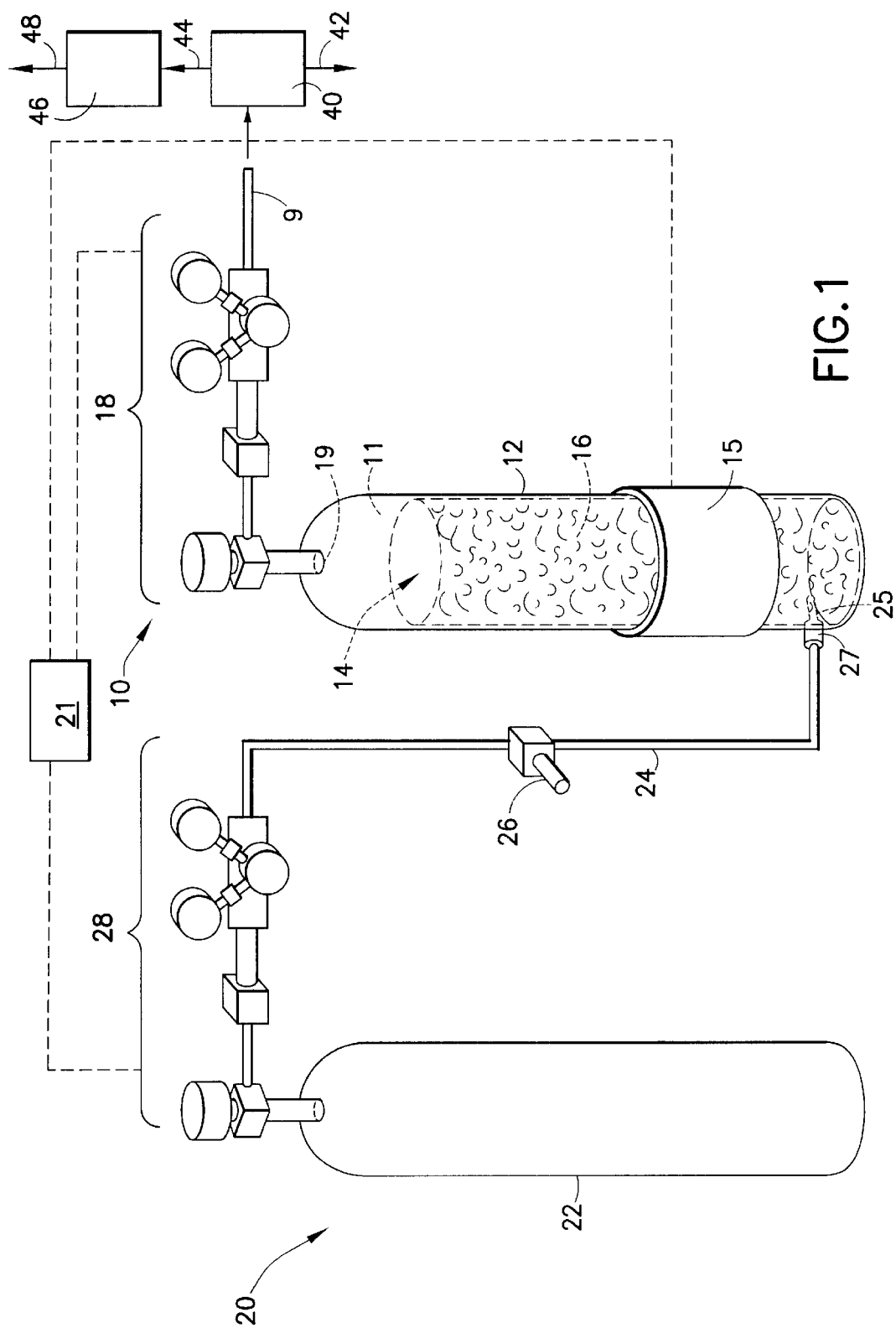
FIG. 1 is a schematic representation of a sorbate fluid storage and dispensing system and enhancement gas supply means, including an enhancement gas source and associated flow circuitry, according to one embodiment of the invention.

While the ensuing disclosure is directed primarily to adsorption, in which condensation or adhesion of gas(es) on the surface of solids is effected by contact of a gas or gas mixture with a solid having sorptive affinity for such gas(es), it will be appreciated that the invention in various embodiments described hereinafter may be equally applicable to the case of absorption, wherein one material penetrates into the body of another. It is to be understood that in subsequent reference to adsorption, the invention in various embodiments will be equally applicable to absorption.

The term "sorption" therefore is intended to be broadly understood as referring to adsorption as well as absorption, and the term "sorbent" is intended to be broadly understood as comprehending adsorbent materials as well as absorbent materials.

For various sorbents, sorbates, sorbent surface structures and/or sorbent surface treatments, little or no gas may be produced via pressure differential desorption, regardless of the pumping speed and base pressure of an associated pumping system. The apparatus and method of the present invention may be utilized in such situation, to effect an enhanced flow and discharge of the sorbate fluid from the storage and dispensing vessel, relative to corresponding fluid storage and dispensing systems lacking the enhancement means and methodology of the present invention.

The present invention provides a fluid storage and dispensing system, for the dispensing of a sorbate fluid, e.g., a gas or vapor, from a fluid storage and dispensing vessel. The sorbate fluid storage and dispensing vessel holds a sorbent medium, e.g., a solid-phase physical sorbent medium, with sorptive affinity for the sorbate fluid, and having sorbate fluid sorptively associated therewith. The fluid thereby is disposed in the storage and dispensing vessel at an interior fluid pressure, which may be any suitable pressure, but preferably is in the vicinity of atmospheric pressure or at a sub atmospheric pressure. A dispensing assembly is coupled in gas flow communication with the storage and dispensing vessel, for discharging desorbed fluid from the vessel.

In accordance with the present invention, the desorption of the sorbate from the sorbent medium is enhanced by input of energy to the system, involving one or more of the following energy input modalities:

(a) thermal energy (e.g., by inductive heating of sorbent or "chemireactive" heating);

(b) photonic energy (e.g., by microwave, infrared, visible, ultraviolet, x-ray, gamma ray, etc.);

(c) particle bombardment (wherein the particle may be an electron, proton, positron, neutron, alpha particle, atom, ion or other more exotic particles or particle combinations);

(d) mechanical energy (e.g., by ultrasonic and/or acoustic energy input); and (e) "chemical potential" differential.

Each of these energy input modalities is discussed in greater detail hereinafter.

The means for inputting energy to the sorbent medium in accordance with the present invention may be widely varied, and may include various energy sources, energy (particle) generators, transmission and transducer equipment, and associated control and monitoring elements, as will be apparent to those of ordinary skill in the art. Examples of particular means that may be employed in various aspects and embodiments of the invention include ultrasonic horns, vibratory shaker tables, ion generators, gamma radiation guns, inductive heating ovens, heat tapes or jackets, chemical reagent supply vessels, infrared lamps, x-radiation generators, particle guns, e-beam generators, linear accelerators, radioisotopes, etc.

In one embodiment of the present invention, the dispensing of the sorbate fluid is enhanced by coupling an enhancement gas source to the sorbate fluid gas vessel in gas flow communication with the sorbate fluid vessel. The enhancement gas source is constructed and arranged for flowing enhancement gas on demand into the vessel for uptake of the sorbate fluid in the enhancement gas to yield a sorbate fluid-containing enhancement gas mixture, and discharge of the sorbate fluid-containing enhancement gas mixture from the vessel to the dispensing assembly for discharge from the system.

The enhancement gas thus may function as an entrainment medium for desorbed gas from the sorbent, as well as further enhancing the desorption process, e.g., by preferentially sorbing on the sorbent, to thereby displace the product sorbate species for discharge from the vessel, or in other manner serving to increase the amount or ease of removal of the product sorbate species from the sorbent in the vessel.

The disclosures of the following U.S. patents and applications are hereby incorporated herein by reference in their entireties:

U.S. Pat. No. 5,518,528 issued May 21, 1996 in the names of Glenn M. Tom and James V. McManus for Storage and Delivery System for Gaseous Hydride, Halide, and Organometallic Group V Compounds; U.S. Pat. No. 5,704,965 issued Jan. 6, 1998 in the names of Glenn M. Tom and James V. McManus for "Fluid Storage And Delivery System Utilizing Carbon Sorbent Medium;" U.S. Provisional Patent Application No. 60/046,778 filed May 16, 1997 in the names of Glenn M. Tom, Peter S. Kirlin and James V. McManus for "Semiconductor Manufacturing System Utilizing Sorbent-Based Fluid Storage and Dispensing Apparatus and Method for Reagent Delivery;" U.S. Pat. No. 5,704,967 issued Jan. 6, 1998 in the names of Glenn M. Tom, Karl Olander and James V. McManus for "Fluid Storage and Delivery System Comprising High Work Capacity Physical Sorbent;" U.S. Pat. No. 5,707,424 issued Jan. 13, 1998 in the names of Glenn M. Tom and James V. McManus for "Process System With Integrated Gas Storage and Delivery Unit;" U.S. Pat. No. 5,935,305 issued Aug. 10, 1999 in the name of Glenn M. Tom and James V. McManus for "Storage And Delivery System For Gaseous Compounds;" U.S. Pat. No. 5,761,910 issued Jun. 9, 1998 in the name of Glenn M. Tom for "High Capacity Gas Storage and Dispensing System;" and U.S. Pat. No. 5,980,608 issued Nov. 9, 1999 in the name of James Dietz, et al. for "Throughflow Gas Storage and Dispensing System."

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

Concerning gas species with which the apparatus and method of the invention may find utility, a wide variety of sorbate gases may be used, depending on the character of the sorbent material, and the mode of energy input to the sorbent medium for enhanced release of sorbate gas therefrom. Illustrative gas species include, without limitation, hydride and halide gases, and organometallic Group V compounds, e.g., arsine, phosphine, chlorine, $NF_3$, and $(CH_3)_3Sb$, silane, methylsilane, germane, ammonia, stibine, hydrogen sulfide, hydrogen selenide, hydrogen telluride, boron trifluoride, boron trichloride, and deuterated and tritiated derivatives thereof.

Referring now to the drawings, FIG. 1 is a schematic representation of a fluid storage and dispensing system 10 comprising storage and dispensing vessel 12. The storage and dispensing vessel 12 may for example comprise a conventional gas cylinder container of elongate character, having an aspect ratio of height to diameter that may for example be in the range of from about 3 to about 10. In the interior volume 11 of such vessel 12 is disposed a bed 14 of a suitable sorbent medium 16.

The vessel 12 is provided at its upper end with a conventional cylinder head fluid dispensing assembly 18 leak-tightly coupled with the main body of the dispensing vessel 12 at the port 19. The port 19 allows fluid flow from the interior volume 11 of the cylinder into the dispensing assembly 18. To prevent entrainment of particulate solids in the fluid being dispensed from the cylinder, the port 19 may be provided with a frit, screen, grid or other filtration means therein. An energy input jacket 15 is provided for inputting desorption energy to the sorbent medium 16 in the vessel 12. The design and composition of the vessel 12 will be determined in part by the form of energy and the input method.

The storage and dispensing vessel may be maintained at ambient conditions during storage or non-operating conditions, e.g., at an operating pressure less than 15 psia and a temperature of less than 42° C.

The sorbent medium 16 may comprise any suitable sorptively effective material, having sorptive affinity for the fluid to be stored and subsequently dispensed from the vessel 12, and from which the sorbate fluid is suitably desorbable. Examples include: crystalline aluminosilicate compositions, e.g., a micropore aluminosilicate composition with a pore size in the range of from about 4 to about 13 Å, and/or a mesopore crystalline aluminosilicate composition with a pore size in the range of from about 20 to about 40 Å; carbon sorbent materials, such as bead activated carbon sorbents of highly uniform spherical particle shape, e.g., BAC-MP, BAC-LP, and BAC-G-70R bead carbon materials (Kureha Corporation of America, New York, N.Y.), silica, alumina, macroreticulate polymers, porous silicon, kieselguhr, aluminum phosphate, clay, polymers (including porous polytetrafluoroethylene polymers, macroreticulate polymers and glassy domain polymers), aluminum phosphosilicate, etc.

Various forms of carbon sorbent materials may be employed in the broad practice of the invention and include: carbon formed by pyrolysis of synthetic hydrocarbon resins such as polyacrylonitrile, phenolic resins, sulfonated polystryrene-divinylbenzene, etc.; cellulosic char; charcoal; and activated carbon formed from natural source materials such as coconut shells, pitch, wood, petroleum, coal, etc.

A preferred carbon sorbent material is activated carbon, a highly sorbent form of carbon produced by heating granulated charcoal to appropriate elevated temperature. Most preferred are the so-called bead carbon forms of activated carbon, where the beads, i.e., highly uniform diameter spherical particles, may have a diameter in the range of from about 0.1 millimeter to about 1 centimeter, and more preferably from about 0.25 to about 2 millimeters diameter.

The sorbent material may be suitably processed or treated to ensure that it is devoid of trace components that may deleteriously affect the performance of the fluid storage and dispensing system. For example, the sorbent may be subjected to washing treatment, e.g., with hydrofluoric acid, to render it sufficiently free of trace components such as reactive (non-inert) metals and oxidic transition metal species.

Continuing with reference to FIG. 1, a gas source 20 may be provided to supply an enhancement gas for the purpose of facilitating dispensing of sorbate fluid from the fluid storage and dispensing system. The gas source 20 may be in the form of a pressurized vessel or a generating source of the enhancement gas and may alternatively comprise means for heating the enhancement gas (not shown). The enhancement gas itself may comprise a carrier gas, or a gas that otherwise serves to enhance the desorption and release of sorbate gas from the sorbent medium 16, as hereinafter described. When the enhancement gas is a carrier gas, such gas preferably is inert in nature as regards the end use of the sorbate. Suitable carrier gas species include nitrogen, helium, argon, etc.

The enhancement gas may additionally, or alternatively, comprise a gas that is more strongly sorbed by the sorbent medium than the gas to be initially stored on and desorbed from the sorbent medium, so that when the enhancement gas is introduced to the vessel, the enhancement gas serves to preferentially (in relation to the product sorbate gas species) sorb on the sorbent medium and displace the product sorbate gas species so that it can be discharged from the vessel.

As a still further alternative, the enhancement gas may interact with the sorbate gas to form a complex or compound, so that the enhancement gas reactively or interactively "extracts" the sorbate gas from the sorbent medium.

The enhancement gas source 22 is joined by line 24 to the sorbate gas dispensing vessel 12 through enhancement gas entry port 27, thereby establishing gas flow communication of the enhancement gas source 22 with the dispensing vessel 12. The gas entry port 27 and enhancement gas insertion tube 25 may be located anywhere along the cylinder, but are preferably located at the opposite end of the sorbate fluid dispensing vessel from dispensing port 19 in order to maximize the through-flow effect (for entrainment of desorbed gas) and the extent of enhancement gas contact with the sorbent medium 16.

Means (not shown) may be provided in the vessel, such as nozzles, spargers, distributors, flow spreaders, dispersers, etc., serving to distribute the enhancement gas flow in the interior volume of the vessel, to thereby achieve maximum extraction of the sorbable fluid from the sorbent material in the vessel and uptake of same in the enhancement gas stream.

A dispensing assembly 28 in the embodiment shown is associated with means for regulating the flow of the enhancement gas from source 22 through the system. The gas dispensing assembly 28 may suitably comprise a monitoring and flow regulating means.

The gas dispensing assembly 28 is used to monitor enhancement gas flow rate through line 24 into sorbate fluid dispensing vessel 12 via enhancement gas insertion tube 25. An isolation valve 26 is provided on line 24 as an alternate means of shutting off enhancement gas flow to the sorbate gas dispensing vessel 12. Enhancement gas entry port 27 is equipped with a tube coupling means (not shown) to facilitate exchange (change-out) of the enhancement gas source 22.

Both the enhancement gas dispensing assembly 28 and the sorbate fluid dispensing assembly may be controllably linked to a microprocessor—based control system 21 or other suitable control means, as shown, for regulating fluid flows depending on the desired sorbate fluid concentrations in the gas mixture of enhancement gas and sorbate fluid that is discharged from the vessel through the discharge port 19. An additional microprocessor link may be made to the energy input jacket 15, as shown, to effect selective actuation or deactuation of the energy input jacket for the purpose of selectively controlling desorption, if and as desired.

The enhancement gas stream containing the sorbable fluid entrained therein is discharged from the vessel 12 as shown in FIG. 1 into discharge line 9, which may comprise a conduit, tubing, piping, flow channel, or other flow passage means for dispensing fluid exteriorly of the storage and dispensing vessel.

From discharge line 9, the gas mixture may be passed to a recovery unit 40, wherein the sorbate gas mixture including the sorbate gas and the enhancement gas are separated from one another, to produce a separated enhancement gas stream that is discharged from the recovery unit 40 in line 42 and a separated sorbate gas stream that is discharged from the recovery unit 40 in line 44. Recovery unit 40 may also function to alter the pressure or flow of the sorbate gas.

From the recovery unit 40, the sorbate gas stream in line 44 flows to end use facility 46, such as an ion implant chamber or doping apparatus or other process system in which the sorbate fluid component of the carrier gas stream is utilized. The end use facility may produce an effluent gas stream deriving from the sorbate gas, which is discharged from the end use facility in line 48 and may be passed to effluent treatment or other disposition.

Alternatively, the sorbate gas may be reacted with the enhancement gas and the downstream processing apparatus may include a decomposition, extraction, or reaction unit constructed and arranged to recover the sorbate gas. For example, the enhancement gas may reversibly react with the sorbate gas, and the downstream recovery unit may comprise a chamber in which the conditions favor the reverse reaction to liberate from the reaction product the sorbate gas.

In lieu of a recovery unit 40, other processing or treatment unit may be employed, or such unit may not be present at all, depending on the gas species and end use involved, and the sorbate gas mixture in line 9 may be passed directly to the end use facility 46.

It will be apparent that many other arrangements can be utilized in specific applications wherein the sorbate gas is recovered, purified or otherwise processed for ultimate use, by corresponding processes well known in the art of fluid processing and treatment.

It will also be appreciated that in various embodiments of the invention, no enhancement gas may be necessary, e.g., in instances where the input of energy by the energy input jacket 15 is sufficient to effect desorption of the sorbate in amounts that do not require enhancement gas addition or flow through the storage and dispensing vessel 12.

In accordance with the invention, the energy input jacket 15 may be constructed and arranged to input to the sorbent bed any of various suitable forms of energy for effecting or assisting the desorption of the sorbate from the sorbent medium, including multiple energy forms. Illustrative forms of energy include those described below.

Thermal Energy—Inductive Heating of Sorbent and Chemireactive Heating

Desorption of the adsorbed species may be effected by the application of heat to the sorbent, to effect increased desorption of the sorbate. For example, this may be accomplished by inductively heating a resistive adsorbent, e.g., graphite or carbon. This may also be effected by formulating the adsorbent composition so that it can be inductively heated, such as by compounding the sorbent material, e.g., a silica, clay or mineralic sorbent material, with a material, e.g., an inert metal (e.g., platinum, iridium, gold, etc.) imparting inductive heating capability to the sorbent.

Inductive heating may for example be implemented in a system of the type shown in FIG. 1, wherein the energy input jacket 15 comprises an inductive heating unit serving to inductively heat the sorbent medium 16.

Alternatively, desorption of the adsorbed species may be effected by the application of resistive heating. Resistive heating may for example be implemented in a system of the type shown in FIG. 1, wherein the energy input jacket comprises two electrodes that are electrically isolated from the cylinder and one another and in contact with different regions of the sorbent medium 16. Passing sufficient current through the sorbent will enable heating of the sorbent medium.

Conductive heating may also be used to heat the sorbent material. Conductive heating may also be implemented in a system of the type shown in FIG. 1, wherein the energy imput jacket would comprise a heater jacket.

A chemical reaction may also be used to heat the sorbent material, i.e. a chemical that reacts with the sorbent exothermically to produce heat and increase the vapor pressure of the sorbate. As an example, the sorbent may be coated with an adsorbent and the sorbent is contacted with a reactant gas that is exothermally reactive with the sorbent to generate heat in a manner that causes the hot adsorbent to desorb the sorbate. Such exothermic reaction is desirably one in which the products of the reaction are solid phase by-products or, if vapor phase by-products are generated by the exothermic reaction, then the vaporphase by-products of the reaction should be species that do not contaminate or otherwise deleteriously affect the product sorbate gas that is desorbed from the sorbent during the exothermic reaction. Thus, for example, the by-product preferably is a solid by-product with no appreciable vapor pressure, or a gas that is an acceptable diluent for the product sorbate gas.

By way of example, the exothermically reactive gas may be introduced in a system of the type shown in FIG. 1, as the enhancement source gas from gas source 20.

Photonic Energy (Microwave, Infrared, Visible, Ultraviolet, X-ray, Gamma Ray) Impingement, and Particle Bombardment of the Sorbent The vapor pressure of the sorbate gas may also be changed by photonic energy impingement on the sorbent and/or by particle bombardment of the sorbent, e.g., using electrons, protons, positrons, neutrons, alpha particles, atoms, ions or other more exotic particles or particle combinations.

The photonic energy may be of any suitable type, e.g., microwave, infrared, visible, ultraviolet, x-ray, gamma ray or other radiation form.

Figure 2:
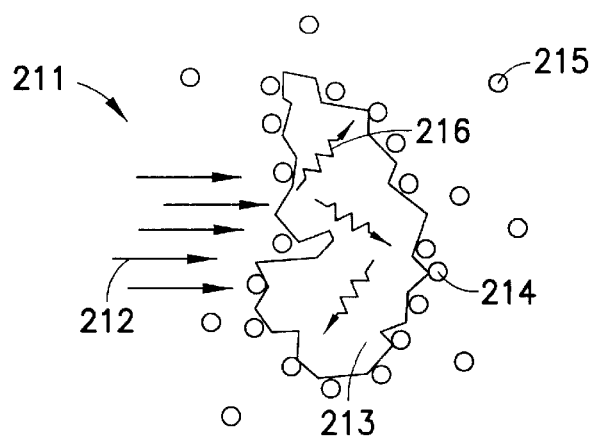
FIG. 2 is a schematic representation of a sorbent medium environment, wherein desorption of sorbate is effected by photonic energy input and/or particle impingement and resultant heating of the sorbent medium.

The energetic particles act to heat the adsorbent and raise the vapor pressure, as shown schematically in FIG. 2, wherein there is shown an interior volume 211 of a gas storage and dispensing of the general type shown and described in Tom et al. U.S. Pat. No. 5,518,528, the disclosure of which is hereby incorporated herein in its entirety. The interior volume 211 contains a bed of sorbent particles 213 having associated therewith a sorbed gas 214. The sorbent is heated (with thermal energy flux being illustratively shown by arrows 216) to generate desorbed gas 215, under the impetus of the impinged photons or particles 212.

In the case of photonic energy input, the photons may be "tuned" by correspondingly selected excitation conditions for the photon generator, so that the impinged photonic energy is absorbed in the sorbent medium to thereby liberate the sorbate.

In one embodiment, more than one sorbate species could be sorbed on the sorbent and the desired sorbate species can thereafter be removed by selecting the photon energy required for that particular species, to effect a species-specific desorption of the desired gas component.

Figure 3:
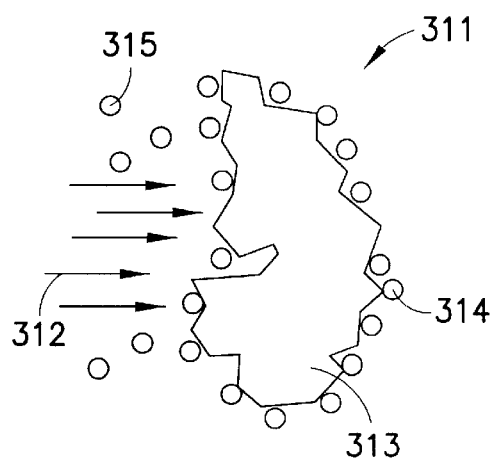
FIG. 3 is a schematic representation of a sorbent medium environment, wherein desorption of sorbate is effected by photonic energy input and/or particle impingement directly on a sorbate molecule.

FIG. 3 is a corresponding schematic representation of an interior volume 311 of a gas storage and dispensing vessel of the general type shown in FIG. 1, showing the interior volume 311 as containing a bed of sorbent particles 313 having associated therewith a sorbed gas 314. Desorbed gas 315 is produced by direct absorption of photon 312 or through collision of impinging particle 312 with gas 314 and sorbent 313. In the FIG. 3 embodiment, desorption is effected only where an incident photon or particle strikes.

Direct desorption through bombardment thus occurs with the emission of adsorbed species induced by photon absorption or particle-stimulated desorption. Since re-adsorption is likely to occur in this system unless the surface reconstructs, it is necessary to ensure that a sufficient amount of the gas escapes the sorbent region, and that further collision of the liberated gas molecules with the sorbent surface are minimized. For such purpose, the ambient environment of the sorbent (the interior volume of the storage and dispensing vessel) may contain a second gas species that will react with the desorbed species to form a non-resorbable compound or complex. For example, the desorbed species may be reacted with a Lewis base species to form a chemically stabilized Lewis base complex, thereby rendering the desorbed gas molecules less likely to recombine with the sorbent. The second gas may alternatively be a carrier gas that physically carries the desorbed gas away, without requiring a chemical reaction between the two gases, and even a reactive stabilizing gas may be flowed through the sorbent bed to entrain the desorbed gas molecules, thereby minimizing the amount of resorption.

The impingement media may be of any suitable type. Examples include, without limitation, electrons, protons, positrons, neutrons, alpha particles, atoms, ions or other more exotic particles or particle combinations.

Photonic energy may be utilized in a system of the type shown in FIG. 1, wherein the energy input jacket 15 comprises a photon generator or other photon energy source. For such purpose, the jacket or other photon energy source may be interiorly disposed in the interior volume of the storage and dispensing vessel, or the photonic energy may otherwise be inputted to the sorbent medium in the vessel.

Particle bombardment may be employed in a system of the type shown in FIG. 1, wherein a particle source or generator is deployed, interiorly arranged in the vessel 12, or otherwise positioned and operated to impinge particles on the sorbent medium to effect enhanced desorptive release of the sorbate from the sorbent medium.

Mechanical Energy Input

Mechanical means may be used to cause desorption to occur. For example, if the vessel containing the sorbent is made to vibrate the sorbent will heat, raising the vapor pressure of the sorbate and enabling the dispensing of the gas through the establishment of a pressure difference. The system could be made to vibrate using acoustic or ultrasonic agitation, by way of example.

A vibratory mode of operation may be implemented in a system of the type shown in FIG. 1 hereof, wherein the energy input jacket 15 comprises a vibratory collar unit, emitting acoustic or ultrasonic waves that are transmitted to the sorbent medium in bed 14 in the vessel. Alternatively, the vibratory unit could be interiorly disposed in the vessel, or otherwise arranged to impart the desired desorptive energy to the sorbent medium in the vessel.

Chemical Potential Differential

In this embodiment of the invention, desorption of the sorbed chemical species is effected by introduction of a chemical species that will substitute for the adsorbed species or react with it in such a way that the vapor pressure of the molecule is different than the initially sorbed species. For example, one sorbate may be added to displace the original sorbate preferentially from the adsorbent. If this displacement process is exothermic, the increase in surface temperature will assist displacement of the sorbed gas.

Figure 4:
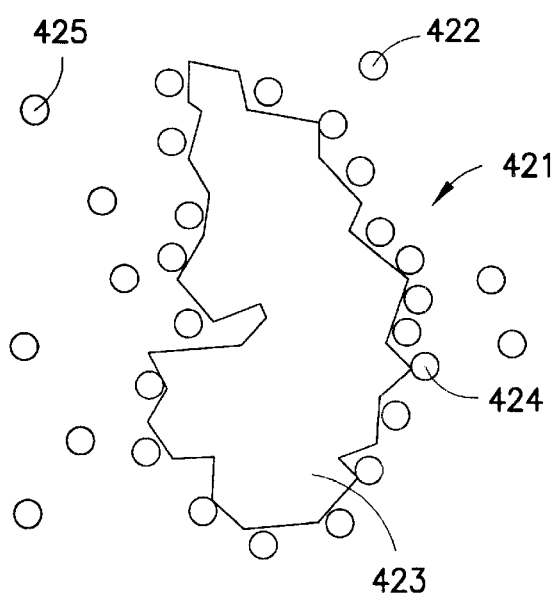
FIG. 4 is a schematic representation of a sorbent medium environment, wherein desorption of sorbate is effected by sorptive displacement of the sorbate by a more strongly sorbed displacement fluid.

FIG. 4 shows this process schematically. A sorbate gas species 424 is adsorbed on adsorbent 423, which resides in an evacuated chamber environment 421. Chemical species 422 is introduced into the evacuated chamber environment 421. At the surface of sorbent 423, chemical species 422 reacts in such a way that the sorbate gas species is desorbed to yield desorbate species 425, while chemical species 422 is concurrently adsorbed. Alternatively, a chemical reaction between chemical species 422 and sorbate gas species 424 may be carried out to yield a reaction product species 425 with substantially different vapor pressure than either reactant species 422 or 424 alone.

A chemical reactant may be introduced in a system of the type shown in FIG. 1 hereof, by introduction thereof as a component of the enhancement gas that is introduced into the vessel from gas source 20.

In variant embodiments of the present invention, sorbable chemical species may be absorbed within a chemical (molecular) cage structure, e.g., using fullerenes, nanotubes, calixarenes, other chelating ring structures, or Lewis base ligand species and polymers. Desorption may be caused to occur by heating the system, or in embodiments in which the sorbate is chelated or complexed, through the introduction of a chemical "key" agent for effecting release of the sorbate molecules from the structure or agent retaining same. Polymeric beads may be employed as adsorbent storage media, and a Lewis acid-base chemical bonding scheme for hydride gases may be employed for complexation of hydride gases. When chemical cage structures are employed, the enhanced desorption approach of the present invention may be utilized, so that instead of pumping on the chemical cage and relying on escape of the sorbate gas via diffusion, the chemical cage structure is opened using thermal, photon, particle bombardment, mechanical or chemical means in accordance with the present invention.

In one embodiment the chemical cage is conductive, e.g. nanotubes, doped poly(aniline), poly(acetylene) and poly (phenylenevinylene); and desorption of the adsorbed chemical species is effected by passing a current through the chemical cage structure.

The variant approaches of the present invention greatly expand the number and type of adsorbents and adsorbates that may be used in sorbent-based fluid storage and dispensing systems. The resulting increase in flexibility permits lower cost adsorbents to be used in many applications, with increased choices for specific gases or other fluids of interest.

Further, by requiring two actions to take place—the input of energy or other agent to the system comprising the sorbed species, followed by the desorption and removal of the liberated gas from the system—the system is intrinsically safer from an operator and tool standpoint. For example, the system may be arranged so that gas does not enter the tool unless the gas storage and dispensing vessel is evacuated and energy is applied. Finally, the system may be arranged so that there is opportunity to further purify (or re-purify if contamination has occurred) the gas storage and dispensing vessel before gas discharge from the vessel can be permitted to occur. A gas storage and dispensing vessel may be opened, evacuated for a period sufficient to remove higher vapor pressure contaminants, then energy applied to the system to cause the desired adsorbed gas to be desorbed in active gas dispensing operation.

The various features and aspects illustratively disclosed herein may be utilized separately or in various permutations or combinations with one another, to provide a fluid storage and dispensing system constituting a useful fluid source for specific applications and usage requirements.

Thus, while the invention has been illustratively described herein with reference to specific elements, features and embodiments, it will be recognized that the invention is not thus limited in structure or operation, but that the invention is to be broadly construed consistent with the disclosure herein, as comprehending variations, modifications and embodiments as will readily suggest themselves to those of ordinary skill in the art.

What is claimed is:

1. A method of supplying a sorbate fluid for a use requiring same, comprising:
   providing the sorbate fluid in a sorptively retained state on a sorbent medium; and
   desorbing sorbate fluid from the sorbent medium, comprising inputting energy to the sorbent medium including at least one energy input modality selected from the group consisting of:
   (a) thermal energy input wherein the sorbent medium comprises a resistive material, and said thermal energy input includes resistive heating of the sorbent medium resistive material;
   (b) chemical reaction heating of the sorbent medium by introducing a chemical reactant thereto;
   (c) photonic energy input to the sorbent medium, wherein said photonic energy is selected from the group consisting of microwave, infrared, visible, ultraviolet, x-ray, and gamma ray energies;
   (d) particle bombardment of the sorbent medium;
   (e) mechanical energy input to the sorbent medium; and
   (f) application of a chemical potential differential to the sorbate fluid on the sorbent medium, wherein the chemical potential differential is applied by reacting the sorbate fluid with a reactant fluid species to form a reaction product of different vapor pressure than the sorbate fluid.

2. The method of claim 1, wherein the desorbing step comprises inputting thermal energy to the sorbent medium.

3. The method of claim 1, wherein the desorbing step comprises resistive heating of the sorbent medium.

4. The method of claim 1, wherein the desorbing step comprises chemical reaction heating of the sorbent medium, by contacting a chemical reactant with the sorbent medium.

5. The method of claim 1, wherein the desorbing step comprises inputting photonic energy to the sorbent medium, wherein said photonic energy is selected from the group consisting of infrared, visible, ultraviolet, x-ray, and gamma ray energies.

6. The method of claim 1, wherein the desorbing step comprises particle bombardment of the sorbent medium.

7. The method of claim 6, wherein the particle bombardment comprises impingement of particles selected from the group consisting of electrons, protons, positrons, neutrons, alpha particles, atoms, ions, and combinations thereof.

8. The method of claim 1, wherein the desorbing step comprises inputting mechanical energy input to the sorbent medium.

9. The method of claim 8, wherein the mechanical energy comprises ultrasonic and/or acoustic energy.

10. The method of claim 1, wherein the desorbing step comprises applying a chemical potential differential to the sorbate fluid on the sorbent medium, wherein the chemical potential differential is applied by reacting the sorbate fluid with a reactant fluid species to form a reaction product of different vapor pressure than the sorbate fluid.

11. The method of claim 1, further comprising purifying the desorbed sorbate fluid of accompanying fluid components.

12. The method of claim 1, further comprising manufacturing a semiconductor product comprising use of the desorbed sorbate fluid.

13. The method of claim 12, wherein the semiconductor manufacturing comprises ion implantation using the desorbed sorbate fluid.

14. The method of claim 1, wherein said at least one energy input modality comprises (f) application of a chemical potential differential to the sorbate fluid on the sorbent medium, and wherein said reactant fluid species chelates or complexes with said sorbate fluid.

15. An apparatus for storage and dispensing of a sorbate fluid, comprising:
   a storage and dispensing vessel with an interior volume containing a sorbent medium having the sorbate fluid sorptively associated therewith;
   a dispensing assembly coupled to the vessel in flow communication with the interior volume of the vessel for selectively discharging desorbed sorbate fluid from the storage and dispensing vessel; and
   an energy input unit arranged to enhance desorption of sorbate fluid from the sorbent medium, by inputting energy to the sorbent medium comprising at least one energy input modality selected from the group consisting of:

(a) thermal energy input, wherein the sorbent medium comprises a resistive material, and said thermal energy input includes resistive heating of the sorbent medium resistive material;
(b) chemical reaction heating of the sorbent medium by introducing a chemical reactant into the storage and dispensing vessel;
(c) photonic energy input to the sorbent medium, wherein said photonic energy is selected from the group consisting of infrared, visible, ultraviolet, x-ray, and gamma ray energies;
(d) particle bombardment of the sorbent medium;
(e) mechanical energy input to the sorbent medium; and
(f) application of a chemical potential differential to the sorbate fluid on the sorbent medium, wherein the chemical potential differential is applied by reacting the sorbate fluid with a reactant fluid species to form a reaction product of different vapor pressure than the sorbate fluid.

16. The apparatus of claim 15, wherein the energy input unit is arranged to enhance desorption of sorbate fluid from the sorbent medium, by inputting thermal energy to the sorbent medium.

17. The apparatus of claim 15, wherein the energy input is arranged to effect resistive heating of the sorbent medium.

18. The apparatus of claim 15, wherein the energy input unit is arranged to effect chemical reaction heating of the sorbent medium, by supplying a chemical reactant into the storage and dispensing vessel.

19. The apparatus of claim 15, wherein the energy input unit is arranged to enhance desorption of sorbate fluid from the sorbent medium, by inputting photonic energy to the sorbent medium, wherein said photonic energy is selected from the group consisting of infrared, visible, ultraviolet, x-ray, and gamma ray energies.

20. The apparatus of claim 15, wherein the energy input unit is arranged to enhance desorption of sorbate fluid from the sorbent medium, by particle bombardment of the sorbent medium.

21. The apparatus of claim 20, wherein the particle bombardment comprises impingement of particles selected from the group consisting of electrons, protons, positrons, neutrons, alpha particles, atoms, ions, and combinations thereof.

22. The apparatus of claim 15, wherein the energy input unit is arranged to enhance desorption of sorbate fluid from the sorbent medium, by inputting mechanical energy input to the sorbent medium.

23. The apparatus of claim 22, wherein the mechanical energy comprises ultrasonic and/or acoustic energy.

24. The apparatus of claim 15, wherein the energy input unit is arranged to enhance desorption of sorbate fluid from the sorbent medium, by applying a chemical potential differential to the sorbate fluid on the sorbent medium, wherein the chemical potential differential is applied by reacting the sorbate fluid with a reactant fluid species to form a reaction product of different vapor pressure than the sorbate fluid.

25. The apparatus of claim 15, wherein the dispensing assembly comprises a valve head structure.

26. The apparatus of claim 15, wherein the dispensing assembly comprises a gas flow control valve.

27. The apparatus of claim 15, wherein the dispensing assembly comprises a gas pressure regulator.

28. The apparatus of claim 15, wherein the energy input unit exteriorly circumscribes at least a portion of the storage and dispensing vessel.

29. The apparatus of claim 15, further comprising a recovery unit downstream from the dispensing assembly for purifying the sorbate fluid of accompanying fluid components.

30. The apparatus of claim 15, further comprising a semiconductor manufacturing facility coupled in sorbate fluid receiving relationship to the dispensing assembly.

31. The apparatus of claim 30, wherein the semiconductor manufacturing facility comprises an ion implantation facility.

32. The apparatus of claim 15, wherein the sorbent medium comprises a solid-phase physical adsorbent.

33. The apparatus of claim 15, wherein said energy to the sorbent medium that is inputted by said energy input unit, comprises at least two energy input modalities selected from said group.

34. The apparatus of claim 15, wherein said at least one energy input modality comprises (f) application of a chemical potential differential to the sorbate fluid on the sorbent medium, and wherein said reactant fluid species chelates or complexes with said sorbate fluid.

* * * * *